(12) United States Patent
Planeta et al.

(10) Patent No.: US 11,820,881 B2
(45) Date of Patent: Nov. 21, 2023

(54) PLASTIC PRO-BIODEGRADATION ADDITIVES, BIODEGRADABLE PLASTIC COMPOSITIONS, AND RELATED METHODS

(71) Applicant: Singular Solutions Inc., North York (CA)

(72) Inventors: Mirek Planeta, Mississauga (CA); Alex Mann, Vaughan (CA); Vladimir Climov, Toronto (CA)

(73) Assignee: SINGULAR SOLUTIONS INC., North York (CA)

( * ) Notice: Subject to any disclaimer, the term of this patent is extended or adjusted under 35 U.S.C. 154(b) by 128 days.

(21) Appl. No.: 17/220,029

(22) Filed: Apr. 1, 2021

(65) Prior Publication Data

US 2021/0309848 A1   Oct. 7, 2021

Related U.S. Application Data

(60) Provisional application No. 63/004,251, filed on Apr. 2, 2020.

(51) Int. Cl.

| | | |
|---|---|---|
| *C08L 3/02* | (2006.01) | |
| *C08L 67/04* | (2006.01) | |
| *C08J 3/22* | (2006.01) | |
| *C08L 67/02* | (2006.01) | |
| *C08L 23/06* | (2006.01) | |
| *C08L 23/02* | (2006.01) | |

(52) U.S. Cl.
CPC .............. *C08L 67/02* (2013.01); *C08J 3/226* (2013.01); *C08L 3/02* (2013.01); *C08L 23/02* (2013.01); *C08L 23/06* (2013.01); *C08L 67/04* (2013.01); *C08J 2303/02* (2013.01); *C08J 2403/02* (2013.01); *C08L 2201/06* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | |
|---|---|---|
| 4,620,999 A | 11/1986 | Holmes |
| 5,196,247 A | 3/1993 | Wu et al. |
| 5,217,655 A | 6/1993 | Schmidt |
| 5,258,422 A | 11/1993 | Chang et al. |
| 5,281,691 A | 1/1994 | Hubbs et al. |
| 5,391,423 A | 2/1995 | Wnuk et al. |
| 5,626,939 A | 5/1997 | Kotlair et al. |
| 5,844,023 A | 12/1998 | Tomka |
| 5,849,374 A | 12/1998 | Gruber et al. |
| 5,939,467 A | 8/1999 | Wnuk et al. |
| 6,075,118 A | 6/2000 | Wang et al. |
| 6,322,899 B1 | 11/2001 | Karhuketo et al. |
| 7,019,043 B2 | 3/2006 | Maehara |
| 7,077,994 B2 | 7/2006 | Bond et al. |
| 7,098,292 B2 | 8/2006 | Zhao et al. |
| 7,517,937 B2 | 4/2009 | Yano et al. |
| 7,943,218 B2 | 5/2011 | Knoerzer et al. |
| 8,067,485 B2 | 11/2011 | Changping |
| 8,637,126 B2 | 1/2014 | Cleveland et al. |
| 8,993,653 B2 | 3/2015 | Kaya |
| 9,010,338 B2 | 4/2015 | Rustemeyer et al. |
| 9,221,104 B2 | 12/2015 | Moore et al. |
| 9,796,842 B2 | 10/2017 | Wang et al. |
| 9,914,256 B2 | 3/2018 | Tamir |
| 10,239,292 B2 | 3/2019 | Nissenbaum et al. |
| 10,294,666 B2 | 5/2019 | Murdock et al. |
| 10,433,543 B2 | 10/2019 | Bardosh et al. |
| 10,767,026 B2 | 9/2020 | Desrousseaux et al. |
| 10,875,281 B2 | 12/2020 | Przybylinski et al. |
| 2002/0028857 A1 | 3/2002 | Holy |
| 2007/0148384 A1 | 6/2007 | Bowden et al. |
| 2007/0184220 A1 | 8/2007 | Cleveland et al. |
| 2007/0243350 A1* | 10/2007 | Forsberg ................. C08L 23/10 428/35.7 |
| 2008/0128933 A1 | 6/2008 | Przybylinski et al. |
| 2009/0216207 A1 | 8/2009 | Nielsen |

(Continued)

FOREIGN PATENT DOCUMENTS

| | | | |
|---|---|---|---|
| CA | 2476797 A1 | | 8/2003 |
| CN | 104045905 | * | 9/2014 |

(Continued)

OTHER PUBLICATIONS

Blackstock, Guide to Biochemistry, (1989) pp. 20-31. (Year: 1989).*

(Continued)

*Primary Examiner* — David J Buttner
(74) *Attorney, Agent, or Firm* — Bereskin & Parr LLP/S.E.N.C.R.L., s.r.l.

(57) ABSTRACT

A plastic pro-biodegradation additive includes a carrier polymer and a nanostarch compound. The nanostarch compound can include nanostarch with a particle size in a range of about 40 to about 500 nm. The nanostarch compound can include small-size and/or large-size regular starch. The carrier polymer can be a biodegradable polymer. The additive can include: a polysaccharide; an organic filler; one or more of a monosaccharide, a disaccharide and an oligosaccharide; a surfactant; and/or an inorganic filler. The carrier polymer can include a non-biodegradable polymer. Biodegradable plastic compositions and methods of preparing a biodegradable plastic material are also disclosed.

19 Claims, No Drawings

(56) References Cited

U.S. PATENT DOCUMENTS

| | | | |
|---|---|---|---|
| 2009/0311455 A1* | 12/2009 | Bastioli | C08J 5/18 523/128 |
| 2010/0216909 A1 | 8/2010 | Berg Gebert et al. | |
| 2011/0009593 A1 | 1/2011 | Clardy et al. | |
| 2011/0200771 A1 | 8/2011 | Barclay | |
| 2011/0311743 A1* | 12/2011 | Kaneko | C08L 3/02 428/35.5 |
| 2012/0031543 A1 | 2/2012 | Bacon et al. | |
| 2012/0130331 A1 | 5/2012 | Wang et al. | |
| 2012/0135169 A1 | 5/2012 | Tangelder et al. | |
| 2012/0219790 A1 | 8/2012 | Mount, III et al. | |
| 2012/0288693 A1 | 11/2012 | Stanley et al. | |
| 2013/0154151 A1* | 6/2013 | Wang | C08L 23/04 524/502 |
| 2013/0243912 A1 | 9/2013 | Jensen et al. | |
| 2014/0030536 A1 | 1/2014 | Krishnaswamy | |
| 2014/0275439 A1 | 9/2014 | Yamano et al. | |
| 2014/0329039 A1 | 11/2014 | Neuman et al. | |
| 2017/0275070 A1 | 9/2017 | Solomon et al. | |
| 2018/0281359 A1 | 10/2018 | Neuman et al. | |
| 2018/0334564 A1 | 11/2018 | Andrews et al. | |
| 2018/0345637 A1 | 12/2018 | Hackfort et al. | |
| 2019/0099990 A1 | 4/2019 | Sekido et al. | |
| 2019/0152203 A1 | 5/2019 | Nissenbaum et al. | |
| 2020/0062646 A1 | 2/2020 | Ng et al. | |
| 2020/0410904 A1 | 12/2020 | Tiainen et al. | |

FOREIGN PATENT DOCUMENTS

| | | | |
|---|---|---|---|
| CN | 105315589 | * | 2/2016 |
| CN | 108059804 | * | 5/2018 |
| CN | 109651732 A | | 4/2019 |
| CN | 110091564 A | | 8/2019 |
| EP | 2586821 B1 | | 2/2015 |
| EP | 2052030 B1 | | 3/2015 |
| EP | 2481771 B1 | | 5/2017 |
| JP | 2009241342 A | | 10/2009 |
| JP | 2015-39870 A | | 3/2015 |
| KR | 101165342 B1 | | 7/2012 |
| WO | 9627632 A1 | | 9/1996 |
| WO | 0132405 A1 | | 5/2001 |
| WO | 2004048072 A1 | | 6/2004 |
| WO | 2010041063 A2 | | 4/2010 |
| WO | 2011108375 A1 | | 9/2011 |
| WO | 2019229759 A1 | | 12/2019 |
| WO | 2020197419 A1 | | 10/2020 |
| WO | 2022/056641 A1 | | 3/2022 |

OTHER PUBLICATIONS

Thellen et al., Melt processing and characterization of polyvinyl alcohol and polyhydroxyalkanoate multilayer films, Journal of Applied Polymer Science, May 2012, pp. 2314-2324, vol. 127, issue 3.

Thellen et al., A Processing, Characterization and Marine Biodegradation Study of Melt-Extruded Polyhydroxyalkanoate (PHA) Films, Journal of Polymers and the Environment, Jan. 2008, pp. 1-11, vol. 16, issue 1.

Thellen, High barrier multilayer packaging by the coextrusion method: The effect of nanocomposites and biodegradable polymers on flexible film properties, University of Massachusetts Lowell, ProQuest Dissertations Publishing, Dissertation Abstracts International, vol. 72-03, Section B, p. 101; 2011.

Sun et al., Nanofiller Reinforced Biodegradable PLA/PHA Composites: Current Status and Future Trends, Polymers, May 2018, article No. 505, vol. 10, issue 5.

* cited by examiner

PLASTIC PRO-BIODEGRADATION ADDITIVES, BIODEGRADABLE PLASTIC COMPOSITIONS, AND RELATED METHODS

CROSS-REFERENCE TO RELATED APPLICATION

This application claims priority to U.S. Provisional Application No. 63/004,251 filed on Apr. 2, 2021, the entire contents of which are hereby incorporated herein by reference.

FIELD

The present disclosure relates generally to biodegradable and compostable plastics.

BACKGROUND

The following paragraphs are not an admission that anything discussed in them is prior art or part of the knowledge of persons skilled in the art.

U.S. Pat. No. 5,844,023 describes a biologically degradable polymer mixture which consists essentially of starch and at least one hydrophobic polymer. The hydrophobic polymer is in this connection at least substantially biologically degradable and thermoplastically processable and the mixture with the starch comprising a polymer phase mediator or a macromolecular dispersing agent so that the starch is present in the mixture as disperse phase with the hydrophobic polymer as continuous phase, and the phase mediator or the dispersing agent is responsible for the molecular coupling of the two phases. As starch there is preferably used thermoplastic starch which has been prepared substantially with the exclusion of water by means of sorbitol or glycerol. The production of the biologically degradable polymer mixture is also carried out substantially with the exclusion of water.

U.S. Pat. No. 8,067,485 B2 describes a method of preparing a biodegradable polymer composition, said method comprising melt mixing a first biodegradable polyester and a masterbatch, wherein said masterbatch has been formed separately by melt mixing in the presence of a transesterification catalyst a polysaccharide, a second biodegradable polyester and a biodegradable polymer having pendant carboxylic acid groups.

United States Publication No. 2018/0334564 A1 describes biodegradable compositions of polybutylene-succinate (PBS) or polybutylene-succinate-adipate (PBS A) with biobased 3-hydroxybutyrate copolymers are described. In certain embodiments, the copolymer increases the biodegradation rate of the PBS or PBSA. Methods of making the compositions of the invention are also described. The invention also includes articles, films and laminates comprising the compositions.

INTRODUCTION

The following is intended to introduce the reader to various aspects of the present disclosure, but not to define any invention.

In an aspect of the present disclosure, a plastic pro-biodegradation additive includes: a carrier polymer; and a nanostarch compound.

In an aspect of the present disclosure, a biodegradable plastic composition includes: the plastic pro-biodegradation additive; and a non-biodegradable polymer.

In an aspect of the present disclosure, a biodegradable plastic composition includes: the plastic pro-biodegradation additive; and a biodegradable polymer.

In an aspect of the present disclosure, a method of preparing a biodegradable plastic material includes: providing the plastic pro-biodegradation additive; mixing the additive with a non-biodegradable polymer; and extruding the mixture to obtain the biodegradable plastic material.

In an aspect of the present disclosure, a method of preparing a biodegradable plastic material includes: providing the plastic pro-biodegradation additive; mixing the additive with a biodegradable polymer; and extruding the mixture to obtain the biodegradable plastic material.

DESCRIPTION

Various additives, compositions and methods will be described below to provide an example of an embodiment of each claimed invention. No embodiment described below limits any claimed invention and any claimed invention may cover additives, compositions or methods that differ from those described below. The claimed inventions are not limited to additives, compositions and methods having all of the features of any one additive, composition or method described below or to features common to multiple or all of the additives, compositions and methods described below. It is possible that an additive, composition or method described below is not an embodiment of any claimed invention. Any invention disclosed below that is not claimed in this document may be the subject matter of another protective instrument, for example, a continuing patent application, and the applicants, inventors, or owners do not intend to abandon, disclaim, or dedicate to the public any such invention by its disclosure in this document.

The addition of starch, sugar and other microbe-edible substances into biodegradable plastics can improve their biodegradability by increasing bacterial insemination rate due to the fact that those substances present naturally available feedstock for bacteria and thus serve as an appetizer for bacteria while being dispersed within the biodegradable plastic matrix. The present disclosure relates to the discovery that the addition of mechanically and chemically modified nanostarch and its derivatives, biodegradable plastics, polysaccharides, and/or other microbe-edible substances to traditional, non-biodegradable polymers can make those polymers biodegradable, yet their biodegradation rate can be somewhat slower than inherently biodegradable polymers. This discovery opens the way for traditional, non-biodegradable polymers to be eaten my microbes and changed into humus, water and carbon dioxide, once exposed to moisture and bacteria in nature after their use cycle.

Inherently biodegradable plastics (sometimes called bioplastics) can be made either by bacterial fermentation from natural foods (like cornstarch and similar) or synthesized from gas and crude oil byproducts. Such bioplastics include poly(butylene adipate) (PBA), poly(butylene adipate-co-butylene terephthalate) (PBAT), poly(butylene succinate) (PBS), poly(butylene succinate-co-butylene adipate) (PBSA), poly(butylene terephthalate) (PBT), polyhydroxybutyrate (PHB), polyhydroxy-butylhexanoate (PHBH), polydioxanone (PDO), poly(glycolic acid) (PGA), poly(vinyl alcohol) (PVOH), polylactic acid (PLA), poly-epsilon-caprolactone (PCL), poly(limonene carbonate) (PLC), polyhydroxyalkanoate (PHA), polyhydroxyvalerate (PHV), polyhydroxy-butyratevalerate (PHBV), and other biodegradable polymers known to persons skilled in the art. These bioplastics are generally distinct from regular plastics because their monomers and the bioplastics themselves are readily edible by bacteria.

It should be appreciated that regular plastics generally cannot be directly eaten by bacteria. Regular plastic treated with additives described herein undergo a two-step biodegradation process. Firstly, microbe-edible appetizers initiate bacterial insemination and colonization, which produce ferments and/or enzymes able to decompose the surrounding plastic into substances edible by those microbes. Secondly, the surrounding regular plastic is decomposed into bacteria-edible substances that are consumed as well.

The entire process is purely chemotactic, and, in contrast to chemical oxo-degradation processes, avoids the creation of microplastics. The plastic article can stay intact while eaten by bacteria. The process can initiate only after the plastic is discarded into the environment. Until then, it can have a practically unlimited shelf-life and can be fully re-processable and recyclable both with regular and biodegradable/compostable plastics.

Thus, in accordance with an aspect of the present disclosure, a plastic pro-biodegradation additive can include a biodegradable polymer as a carrier polymer. The biodegradable polymer can be selected from PBA, PBAT, PBS, PBSA, PBT, PHB, PHBH, PDO, PGA, PVOH, PLA, PCL, PLC, PHA, PHV, PHBV, other biodegradable polymers known to persons skilled in the art, copolymers or derivatives thereof, and mixtures thereof. In some examples, the additive can include about 30% w/w to about 80% w/w of the biodegradable polymer. In some examples, the additive can include about 50% w/w to about 70% w/w of the biodegradable polymer. In some examples, the additive can include about 60% w/w of the biodegradable polymer.

Alternatively, a plastic pro-biodegradation additive can include a non-biodegradable polymer as a carrier polymer. The non-biodegradable polymer can be selected from polyolefins, polyamides, polyesters, other polymers known to persons skilled in the art, and mixtures thereof. The polyolefin can be selected from low-density polyethylene (LDPE), high-density polyethylene (HDPE), linear low-density polyethylene (LLDPE), polypropylene (PP), other polyolefins and their copolymers and compounds known to persons skilled in the art, including metallocene versions of typical polyolefins, and any mixtures thereof. The polyamide can be selected from nylons, copolymers thereof, and mixtures thereof. The polyester can be selected from polyethylene terephthalate (PET/PETE), polyethylene terephthalate glycol (PETG), and mixtures thereof.

In some exemplary experiments, the inventors tried samples prepared with additions of starch. Since regular starch can be unstable during typical extrusion conditions, and it is characterized by a limited specific area of particles, and limited compatibility with hydrophobic polymers, the inventors worked with a nanostarch compound including 100 nm nanostarch produced via a process of mechanical destruction of regular starch and then capping and partially cross-linking the nanostarch particles using maleic anhidryde in a reactive extrusion process for improved thermal stability and compatibility with other substances used in the additive. Additionally, in some examples, methods of nanostarch preparation can include: chemical reaction or mechanical processing (including, for example, ultrasonic, gamma radiation, extrusion); and/or chemical cross-linking or functionalization. Such methods would be understood by persons skilled in the art.

As used herein, the term "nanostarch" refers to starch nanoparticles having a particle size in a range of about 40 to about 500 nm. While the nanostarch can be of a range of sizes, and a combination of sizes can be included in a nanostarch compound, an optimal size can be around 100 nm based on the inventor's experiments.

In some examples, the nanostarch compound further includes dehydrated small-particle starch, for example, waxy rice starch with a particle size in a range of about 2 to about 13 μm, and large-particle starch, for example, potato starch with a particle size in a range of about 10 to about 70 μm.

Table 1 shows the sizes of various typical natural starches.

TABLE 1

Granule Size of Various Starches

| Starch Species | Granule Size Range (μm) (Coulter Counter) | Average size (μm) |
|---|---|---|
| Waxy Rice | 2-13 | 6.5 |
| High Amylose Corn | 4-22 | 9.8 |
| Corn | 5-25 | 14.3 |
| Cassava | 3-28 | 14 |
| Sorghum | 3-27 | 16 |
| Wheat | 3-34 | 6.5, 19.5 |
| Sweet Potato | 4-40 | 18.5 |
| Arrowroot | 9-40 | 23 |
| Sago | 15-50 | 33 |
| Potato | 10-70 | 36 |
| Canna (Aust. Arrowroot) | 22-85 | 53 |

A comparison of these sizes shows that, for example, 1% of 100 nm nanostarch compared to 20.8 μm regular starch increases a total specific surface area of starch by an average factor of 208. Exemplary calculations are given in Table 2.

TABLE 2

| | starch | nano-startch |
|---|---|---|
| Largest startch of 85 microns | | |
| size, mic | 85 | 0.1 |
| density, gr/cc | 1.5 | 1.5 |
| particle weight, gr | 9.2119E−07 | 1.5E−15 |
| # of particles per gr | 1085555.33 | 6.6667E+14 |
| particle surface area, cm2 | 0.00090746 | 1.256E−09 |
| specific surface are per 1 gr, cm2 | 985.098039 | 837333.333 |
| relative surface area | 1 | 850 |
| Average size of 12 known types of starch—20.8 microns | | |
| size, mic | 20.8 | 0.1 |
| density, gr/cc | 1.5 | 1.5 |
| particle weight, gr | 1.3498E−08 | 1.5E−15 |
| # of particles per gr | 74083029.9 | 6.6667E+14 |
| particle surface area, cm2 | 5.434E−05 | 1.256E−09 |
| specific surface are per 1 gr, cm2 | 4025.64103 | 837333.333 |
| relative surface area | 1 | 208 |
| Smallest startch of 2 microns | | |
| size, mic | 2 | 0.1 |
| density, gr/cc | 1.5 | 1.5 |
| particle weight, gr | 1.2E−11 | 1.5E−15 |
| # of particles per gr | 8.3333E+10 | 6.6667E+14 |
| particle surface area, cm2 | 5.024E−07 | 1.256E−09 |
| specific surface are per 1 gr, cm2 | 41866.6667 | 837333.333 |
| relative surface area | 1 | 20 |

Due to such an increase in surface area, the rate of initial bacterial insemination and colonization increases drastically. Hence, nanostarch can serve for fast onset of the biodegradation process, while regular starch can present feedstock for retaining bacterial colonies long enough to modify and then eat regular plastic.

Thus, in some examples, nanostarch compound can include three constituents: nanostarch for increasing specific surface area exposed to bacteria to speed up the rate of initial bacterial insemination; small regular starch to provide feedstock for developing bacterial colonies; and large regular starch to provide enough feedstock for long-term development of bacterial colonies. In some examples, the nanostarch can have a particle size in a range of about 40 to about 500 nm, and/or an average particle size of about 100 nm. In some examples, the small regular starch can be waxy rice 5.5 μm regular starch with a particle size in a range of about 2 to about 13 μm. In some examples, the large starch can be potato 36 μm regular starch with a particle size in a range of about 10 to about 70 μm. In various examples, the nanostarch compound can have about 1% w/w to about 50% w/w of the nanostarch, about 10% w/w to about 90% w/w of the small-size regular starch, and about 10% w/w to about 90% w/w of the large-size regular starch.

In some examples, described herein, nanostarch compound can be combined with monosaccharides like sucrose, sorbitol, etc., to further speed-up the initial bacterial insemination. The choice of specific type of monosaccharide and its content, as well as content and ratio of starches in the nanostarch compound is specific to type of plastic, extrusion process parameters and end-use product specifications. Nanostarch compound together with monosaccharides can be melt mixed with a matrix of biodegradable plastics like PBAT, PLA, PBS, PHA, PCL, etc., which both serve as a feedstock for bacteria, and allow good dispersion of ingredients of the pro-biodegradation additive in regular plastic it is added to. In some examples, the additive can be limited to 1% w/w to 2% w/w when mixed with traditional non-biodegradable plastics and yet exhibit satisfactory biodegradability.

In some examples, the plastic pro-biodegradation additive can further include a polysaccharide. The polysaccharide can be selected from starch, cellulose, arabinoxylans, chitin, chitosan, pectins, xanthan gum, dextran, welan gum, gellan gum, diutan gum and pullulan, other polysaccharides known to persons skilled in the art, thermoplastic preparations thereof, and mixtures thereof. In some examples, the polysaccharide includes nanostarch and/or a nanostarch compound, as described herein. In some examples, the additive can include about 20% w/w to about 70% w/w of the polysaccharide. In some examples, the additive can include about 20% w/w to about 50% w/w of the polysaccharide. In some examples, the additive can include about 30% w/w of the polysaccharide. Additionally, in some examples, when optical clarity and transparency in the end product are important, the additive can include about 1% w/w to about 20% w/w of the polysaccharide.

In some examples, the plastic pro-biodegradation additive can further include an organic filler. The organic filler can be selected from wood fiber, saw dust, cellulose, rice shells, nut shells, coffee shells, other organic fillers known to persons skilled in the art, and mixtures thereof. In some examples the additive can include about 20% w/w to about 70% w/w of the organic filler. In some examples, the additive can include about 20% w/w to about 50% w/w of the organic filler. In some examples, the additive can include about 30% w/w of the organic filler. In other examples, the additive can include about 0% w/w to about 5% w/w of the organic filler.

In some examples, the plastic pro-biodegradation additive can further include one or more of a monosaccharide, a disaccharide and an oligosaccharide, or other ingredient, which can be selected from glucose, fructose, sucrose, glycerin, erythritol, threitol, arabitol, xylitol, ribitol, mannitol, sorbit, sorbitol, galactitol, galactose, iditol, volemitol, nonitol, isomalt, maltitol, lactitol, myo-inositol, other saccharides known to persons skilled in the art, and mixtures thereof. In some examples, the one or more of a monosaccharide, a disaccharide and an oligosaccharide includes sucrose. In some examples, the additive includes about 3% w/w to about 15% w/w of the one or more of a monosaccharide, a disaccharide, an oligosaccharide, or other ingredient. In some examples, the additive includes about 5% w/w to about 10% w/w of the one or more of a monosaccharide, a disaccharide, an oligosaccharide, or other ingredient.

In some examples, the plastic pro-biodegradation additive can further include a surfactant. The surfactant can be selected from glycerol monostearate (GMS), glycerol distearate (GDS), sorbitol monostearate (SMS), sorbitol distearate (SDS), polysorbate-20, polysorbate-40, polysorbate-60, polysorbate-80, sodium stearate, 4-(5-dodecyl) benzenesulfonate, docusate (dioctyl sodium sulfosuccinate), alkyl ether phosphates, benzalkaonium chloride (BAC), perfluorooctanesulfonate (PFOS), other surfactants known to persons skilled in the art, and mixtures thereof. In some examples, the additive includes about 0.5% w/w to about 15% w/w of the surfactant. In some examples, the additive includes about 1% w/w to about 10% w/w of the surfactant. In some examples, the additive includes about 6% w/w of the surfactant.

In some examples, the plastic pro-biodegradation additive can include PBAT, PHA, nanostarch compound, sucrose, and processing aid. In a specific example, the plastic pro-biodegradation additive can include: about 25% w/w of PBAT; about 25% w/w of PHA; about 30% w/w of nanostarch compound; about 10% w/w of sucrose; and about 10% w/w of processing aid.

In some examples, the plastic pro-biodegradation additive can include PBAT, PHA, PBS, nanostarch compound, sucrose, GMS, and glycerin. In a specific example, the plastic pro-biodegradation additive can include: about 15% w/w of PBAT; about 30% w/w of PHA; 15% w/w of PBS; about 30% w/w of nanostarch compound; about 5% w/w of sucrose; about 3% w/w of GMS; and about 2% w/w of glycerin.

The inventors further recognize the problem of plastic waste floating in ocean waters and being swallowed by aquatic animals, potentially leading to their death. Since even the fastest-degrading special marine-degradable plastics may stay intact for months before disintegration, the inventors have developed some examples of the plastic pro-biodegradation additive to contain inorganic fillers (e.g. calcium carbonate, clay, kaoline, and mix of iron ore byproducts), which can result in making the otherwise light and floating plastics like LDPE sink to the bottom of the ocean. In such examples, the addition level of the additive compound can be adjusted to achieve both efficient biodegradation and a density heavier than seawater, and is different for various types of plastics, depending on their density. For example, LDPE with a density of 0.92 g/cm$^3$ mixed with 25% CaCO$_3$ having a density of 2.711 g/cm$^3$ results in a compound with a density of 1.102 g/cm$^3$, ensuring that it would sink in freshwater or seawater. Use of a higher density filler can allow a lower addition level.

Thus, in some examples, the plastic pro-biodegradation additive can further include an inorganic filler. The inorganic filler can be selected from calcium carbonate, clay, kaolin, glass fiber, glass beads, talc, wollastonite, iron ore byproducts, other salt and minerals known to persons skilled in the art, and mixtures thereof. In some examples, the additive includes about 5% w/w to about 60% w/w of the inorganic filler.

Using additives described herein, the inventors have experimented with various polyolefins (LDPE, HDPE, LLDPE, PP), polyamides (nylons and their copolymers), and polyesters (PET/PETE, PETG). All exemplary experimental specimens biodegraded into humus, carbon dioxide and water within about 6 to 24 months, depending on the thickness of the specimen and the addition level of the additive compound (added at concentrations ranging from 0.5% to 5%).

Thus, in accordance with an aspect of the present disclosure, a biodegradable plastic composition can include the plastic pro-biodegradation additive, and a non-biodegradable polymer. The non-biodegradable polymer can be selected from polyolefins, polyamides, polyesters, other polymers known to persons skilled in the art, and mixtures thereof. The polyolefin can be selected from LDPE, HDPE, LLDPE, PP, metallocene versions of typical polyolefins, and mixtures thereof. The polyamide can be selected from nylons, copolymers thereof, and mixtures thereof. The polyester can be selected from PET/PETE, PETG, and mixtures thereof. In some examples, the biodegradable plastic composition can include about 0.5% w/w to about 5% w/w of the additive and about 95% w/w to about 99.5% w/w of the non-biodegradable polymer. In examples in which the additive has a non-biodegradable polymer as the carrier polymer, the biodegradable plastic composition can include more of the additive to ensure adequate biodegradability, for example, about 5% w/w to about 10% w/w of the additive and about 90% w/w to about 95% w/w of the non-biodegradable polymer. In some examples, the density of the biodegradable plastic composition is greater than about 1.1 $g/cm^3$.

One exemplary composition successfully tested that exhibited good biodegradation included 0.5% w/w of PBAT, 0.5% w/w of PHA, 0.6% w/w of nanostarch compound, 0.2% w/w of sucrose, 0.2% w/w of processing aid, and 98% w/w of HDPE. The HDPE, which can be used for shopping bags, was extruded using regular blown film extrusion equipment into a 25 μm thick film. The film samples were immersed in soil in a flower pot, together with a reference sample made from pure HDPE. After one year, the inventors could not find any plastic left in the pot, while the reference sample stayed intact. Tests in a garden gave similar results.

Alternatively, a biodegradable plastic composition can include the plastic pro-biodegradation additive, and a biodegradable polymer. In such examples, the additive can be used to accelerate the biodegradation of bioplastics, including PBA, PBAT, PBS, PBSA, PBT, PHB, PHBH, PDO, PGA, PVOH, PLA, PCL, PLC, PHA, PHV, PHBV, other biodegradable polymers known to persons skilled in the art, copolymers or derivatives thereof, and mixtures thereof. In some examples, the biodegradable plastic composition can include about 0.5% w/w to about 5% w/w of the additive and about 95% w/w to about 99.5% w/w of the biodegradable polymer. In some examples, the density of the biodegradable plastic composition is greater than about 1.1 $g/cm^3$.

In accordance with a further aspect of the present disclosure, a method of preparing a biodegradable plastic material can include providing a plastic pro-biodegradation additive, prepared as a pelletized compound via melt-blending extrusion, mixing the additive with a non-biodegradable polymer, and extruding the mixture to obtain the biodegradable plastic material. In some examples, the method can include melt-blending the mixture. In some examples, the method can include extruding the biodegradable plastic material in the form of a film, sheet or other continuous or discrete product.

It is also known that fish and birds can distinguish between stones and food by shape and color, and color can be important to their choice. When plastic is colorful and looks like food, it can be consumed by birds and sea animals. The inventors contemplate the use of colored plastics that look stone, wood or other natural objects. Thus, in some examples, the plastic pro-biodegradation additive can include an optional color component so that the resulting biodegradable plastic composition looks like stone or wood, making it non-attractive to fish, aquatic animals and birds.

Another strategy contemplated by the inventors to protect aquatic animals is to provide written material and colorful labeling on water-soluble substrates, like TPS (thermoplastic starch), special water-soluble paper, PVOH, and the like. For example, biodegradable PVOH film can dissolve in cold water in a few hours. Alternatively, water soluble ink can be used to print directly on plastic products that are treated with the additive compound. These and other approaches can be implemented to further reduce the environmental impact of the additives and plastic compositions described herein.

While the above description provides examples of one or more additives, compositions and methods, it will be appreciated that other additives, compositions and/or methods may be within the scope of the accompanying claims.

We claim:

1. A plastic pro-biodegradation additive, comprising:
   a carrier polymer; and
   a nanostarch compound,
   wherein the nanostarch compound comprises nanostarch with a particle size in a range of about 40 to about 500 nm,
   wherein the nanostarch compound comprises small-size regular starch with a particle size in a range of about 2 to about 13 μm, and
   wherein the nanostarch compound comprises large-size regular starch with a particle size in a range of about 10 to about 70 μm.

2. The additive of claim 1, wherein the nanostarch compound comprises nanostarch with an average particle size of about 100 nm.

3. The additive of claim 1, wherein the nanostarch compound has about 1% w/w to about 50% w/w of the nanostarch.

4. The additive of claim 1, wherein
   the small-size regular starch comprises waxy rice starch with an average particle size of about 5.5 μm.

5. The additive of claim 4, wherein the nanostarch compound has about 10% w/w to about 90% w/w of the small-size regular starch.

6. The additive of claim 1, wherein
   the large-size regular starch comprises potato starch with an average particle size of about 36 μm.

7. The additive of claim 6, wherein the nanostarch compound has about 10% w/w to about 90% w/w of the large-size regular starch.

8. The additive of claim 1, wherein the carrier polymer is a biodegradable polymer, and the biodegradable polymer is poly(butylene adipate-co-butylene terephthalate) (PBAT), and comprising
   about 30% w/w to about 80% w/w of the biodegradable polymer.

9. The additive of claim 1, comprising a polysaccharide, and the polysaccharide is selected from starch, cellulose, arabinoxylans, chitin, chitosan, pectins, xanthan gum, dextran, welan gum, gellan gum, diutan gum, and pullulan, thermoplastic preparations thereof, and mixtures thereof, and comprising
   about 20% w/w to about 70% w/w of the polysaccharide.

10. The additive of claim 1, comprising an organic filler, and the organic filler is selected from wood fiber, saw dust, cellulose, rice shells, nut shells, coffee shells, and mixtures thereof, and comprising about 20% w/w to about 70% w/w of the organic filler.

11. The additive of claim 1, comprising an ingredient selected from glucose, fructose, sucrose, glycerin, erythritol, threitol, arabitol, xylitol, ribitol, mannitol, sorbit, sorbitol, galactitol, galactose, iditol, volemitol, nonitol, isomalt, maltitol, lactitol, myo-inositol, and mixtures thereof, and comprising about 3% w/w to about 15% w/w of the ingredient.

12. The additive of claim 1, comprising a surfactant, and the surfactant is selected from glycerol monostearate (GMS), glycerol distearate (GDS), sorbitol monostearate (SMS), sorbitol distearate (SDS), polysorbate-20, polysorbate-40, polysorbate-60, polysorbate-80, sodium stearate, 4-(5-dodecyl)benzenesulfonate, docusate (dioctyl sodium sulfosuccinate), alkyl ether phosphates, benzalkaonium chloride (BAC), and perfluorooctanesulfonate (PFOS), and mixtures thereof, and comprising about 0.5% w/w to about 15% w/w of the surfactant.

13. The additive of claim 1, comprising an inorganic filler, and the inorganic filler is selected from calcium carbonate, clay, kaolin, glass fiber, glass beads, talc, wollastonite, iron ore byproducts, and mixtures thereof, and comprising about 5% w/w to about 60% w/w of the inorganic filler.

14. The additive of claim 1, wherein:
the carrier polymer comprises a non-biodegradable polymer, and the non-biodegradable polymer is polyolefin; and
the polyolefin is selected from low-density polyethylene (LDPE), high-density polyethylene (HDPE), linear low density polyethylene (LLDPE), polypropylene (PP), metallocene versions of typical polyolefins, and mixtures thereof.

15. A biodegradable plastic composition, comprising:
the plastic pro-biodegradation additive of claim 1; and
a non-biodegradable polymer,
wherein the non-biodegradable polymer is polyolefin,
comprising about 0.5% w/w to about 5% w/w of the additive and about 95% w/w to about 99.5% w/w of the non-biodegradable polymer.

16. A biodegradable plastic composition, comprising:
the plastic pro-biodegradation additive of claim 1; and
a biodegradable polymer,
wherein the biodegradable polymer is PBAT,
comprising about 0.5% w/w to about 5% w/w of the additive and about 95% w/w to about 99.5% w/w of the biodegradable polymer.

17. The additive of claim 1, wherein the nanostarch compound has about 1% w/w to about 50% w/w of the nanostarch, about 10% w/w to about 90% w/w of the small-size regular starch, and about 10% w/w to about 90% w/w of the large-size regular starch.

18. The additive of claim 1, wherein the nanostarch has an average particle size of about 100 nm, the small-size regular starch comprises waxy rice starch with an average particle size of about 5.5 μm, and the large-size regular starch comprises potato starch with an average particle size of about 36 μm.

19. The additive of claim 18, wherein the nanostarch compound has about 1% w/w to about 50% w/w of the nanostarch, about 10% w/w to about 90% w/w of the small-size regular starch, and about 10% w/w to about 90% w/w of the large-size regular starch.

* * * * *